United States Patent [19]

Igaki

[11] Patent Number: 5,124,548
[45] Date of Patent: Jun. 23, 1992

[54] ENCODER FOR DETECTING RELATIVE DISPLACEMENT HAVING FIRST AND SECOND SCALES AND A LIGHT RECEIVING DEVICE

[75] Inventor: Masahiko Igaki, Tokyo, Japan

[73] Assignee: Canon Kabushiki Kaisha, Tokyo, Japan

[21] Appl. No.: 768,479

[22] Filed: Sep. 27, 1991

Related U.S. Application Data

[63] Continuation of Ser. No. 518,424, May 3, 1990, abandoned.

[51] Int. Cl.⁵ .............................................. G01D 5/34
[52] U.S. Cl. ............................ 250/231.16; 250/237 G
[58] Field of Search .......... 250/231.16, 237 G, 231.14

[56] References Cited

U.S. PATENT DOCUMENTS 3,598,493  8/1971  Fisher ................................... 356/152
3,856,401  12/1974  Heitmann et al. ................... 356/28

FOREIGN PATENT DOCUMENTS 84-063517  4/1984  Japan .
85-140119  7/1985  Japan .
60-140119  7/1985  Japan .

Primary Examiner—David C. Nelms
Assistant Examiner—T. Davenport
Attorney, Agent, or Firm—Fitzpatrick, Cella, Harper & Scinto

[57] ABSTRACT

An encoder is provided with a light emitting device for emitting irradiating light, a first scale on which a substantially light transmitting portion and light shielding portion are periodically provided, a second scale which is adapted to be displaced relatively to the first scale and on which V-shape groove and light transmission plane portions are periodically provided at a first surface facing the first scale, a light receiving device, arranged to face a second surface of the second scale, for receiving light having passed through the first and second scales and a detecting device for detecting the relative displacement of the two scales based on the output signals from the light receiving device.

22 Claims, 14 Drawing Sheets

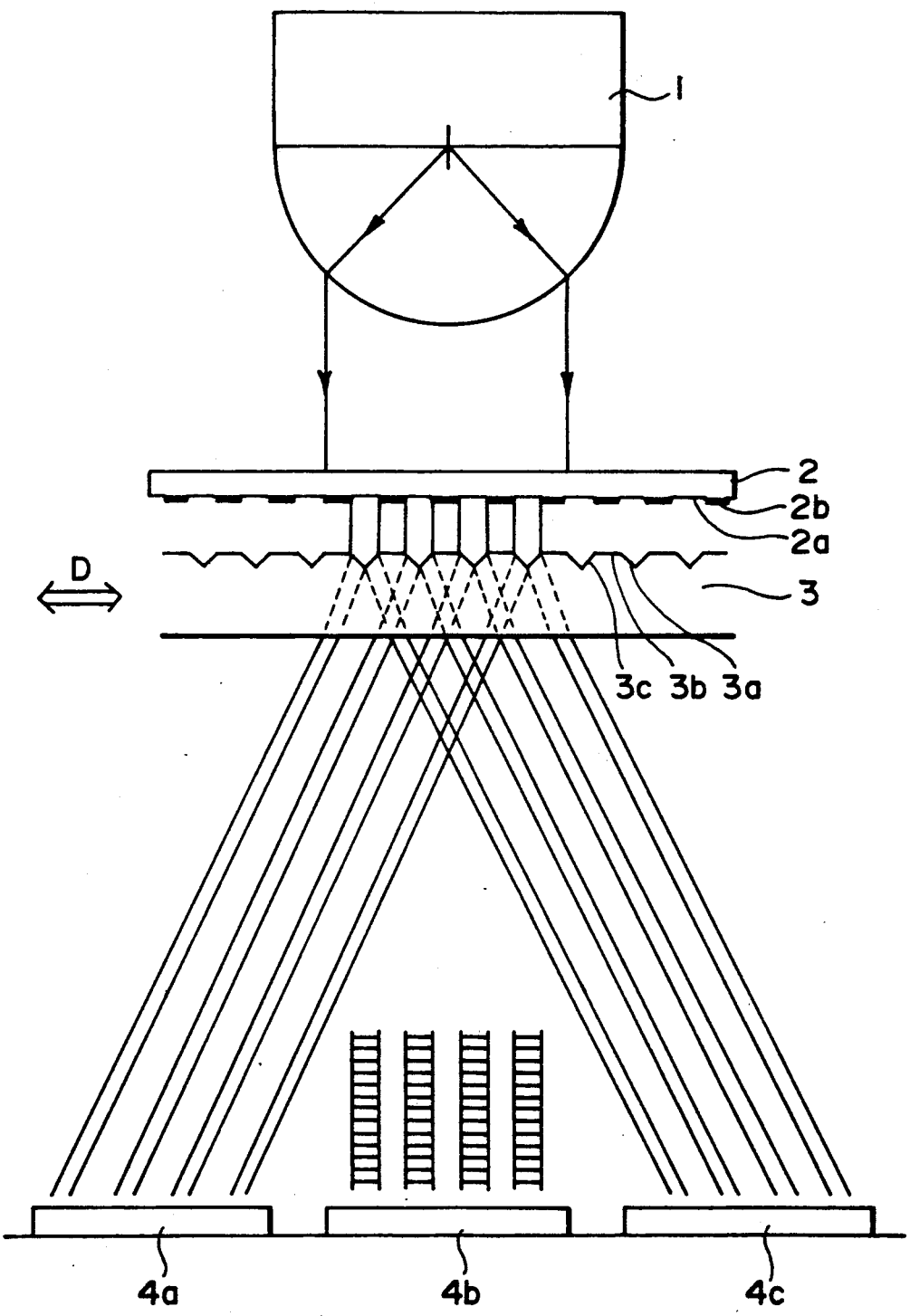
F I G. 2

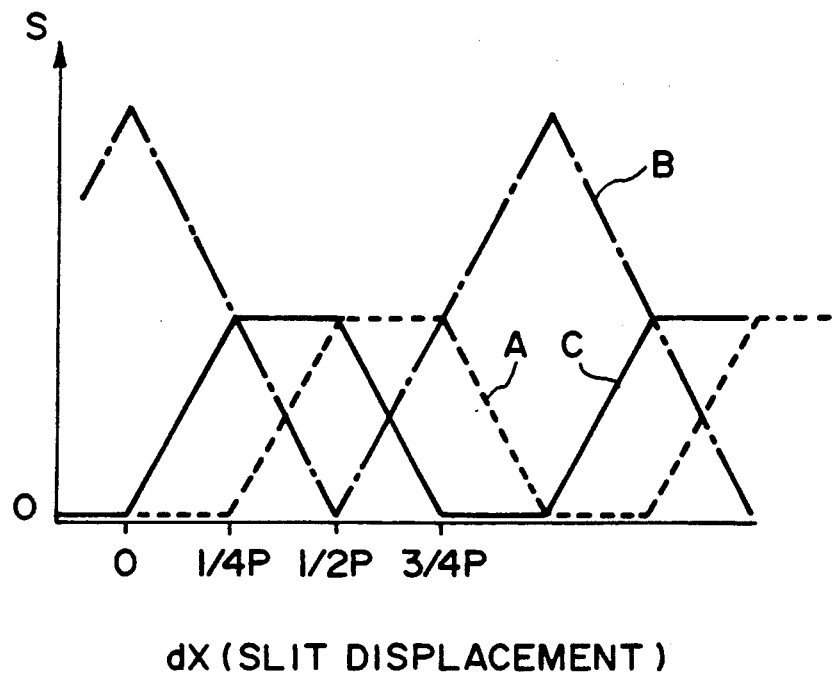
dX (SLIT DISPLACEMENT)
F I G. 10A
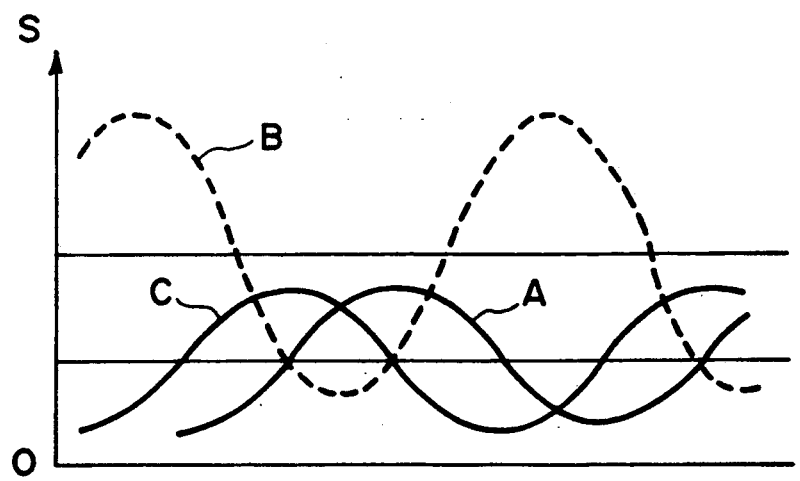
F I G. 10B

ENCODER FOR DETECTING RELATIVE DISPLACEMENT HAVING FIRST AND SECOND SCALES AND A LIGHT RECEIVING DEVICE

This application is a continuation of application Ser. No. 518,424 filed May 3, 1990, now abandoned.

BACKGROUND OF THE INVENTION

1. Field of the Invention

The present invention is related to an optical encoder employing an optical scale for measurement of displacement such as the amount of shift or amount of rotation of the measured object, and particularly to an optical encoder with simple composition which can simultaneously detect the direction of displacement of a measured object.

2. Related Background Art

The so-called optical encoder which detects the amount of shift or rotation of the measured object utilizing an optical scale has been proposed before, for example, in U.S. Pat. No. 3,856,401, Japanese Laid-Open Patent Application Nos. 59-63517 and 60-140119.

For example, U.S. Pat. No. 3,856,401 proposes the optical encoder which employs the optical scale comprising a grooved lattice having a groove of triangular section composed of a light transmission member. According to the publication, two phase output signals (two phase signal of push-pull output) having an electric phase difference of 180° are taken out as the output signal by detecting the light beam projecting in two directions at the inclined surface of the triangular groove by two light receiving devices individually.

However it was not a preferred method because the optical encoder of the publication must be provided with adjusting means to equalize the relative intensity of the two phase output signals in order to obtain the two phase output signals having the phase difference of 90°.

SUMMARY OF THE INVENTION

The objective of the present invention is to provide an optical encoder with simple construction which makes it easy to obtain two output signals having arbitrary phase difference in the range of 0°180°, particularly the output signals with phase difference of accurately 90° and simultaneously enables easy detection of the direction of displacement of an object to be measured, by using an optical scale provided with a V-groove of specified shape which can be easily manufactured by such method of manufacture as plastic molding and two light receiving devices arranged at the specified position relative to the said optical scale.

BRIEF DESCRIPTION OF THE DRAWINGS

FIG. 2 is the schematic drawing to show the state of a part of the progressive light beam of FIG. 1, FIGS. 3A and 3B are an explanatory drawing of movable scale, FIGS. 9A and 9B, FIGS. 10A and 10B are explanatory drawings of the case where the stationary scale, respectively, and the movable scale of FIG. 1 are continuously displaced.

DESCRIPTION OF THE PREFERRED EMBODIMENTS

Figure 1:
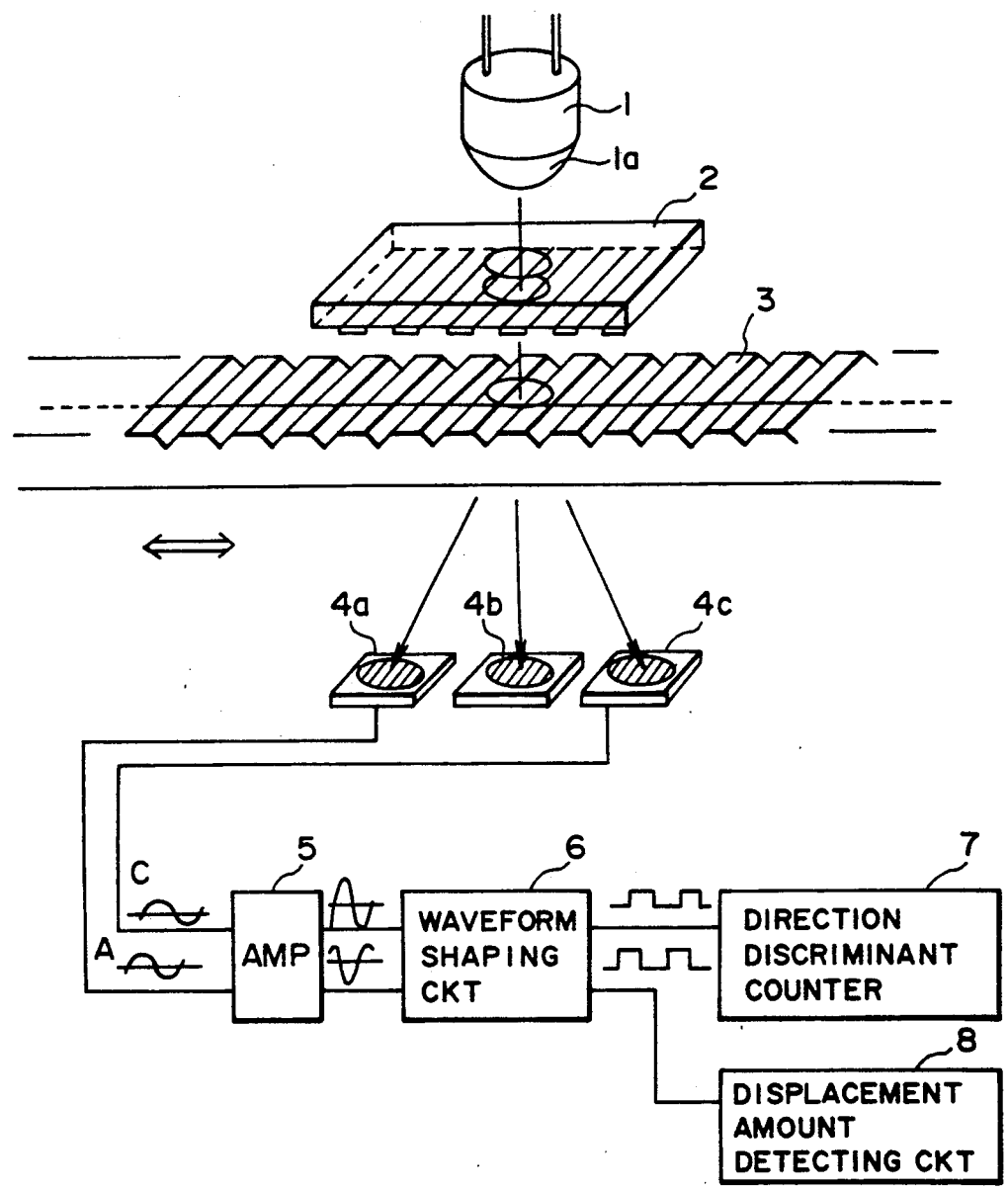
FIG. 1 is the diagonal schematic drawing of the optical encoder of the present invention.

FIG. 1 is a schematic drawing of an optical encoder of the present invention and FIG. 2 is a schematic drawing to indicate the state of a part of the progressive light beam of FIG. 1. In the figures, numeral 1 denotes a light emitting diode such as a semiconductor laser, LED, etc. having lens section 1a, which function to converge light. Numeral 2 denotes a stationary scale as a first scale which is provided with grating-like light transmission portions and light shielding portions that are alternately formed at even-space intervals at pitch P. Numeral 3 denotes a movable scale as a second scale arranged to face the stationary scale 2 and attached to the object to be measured, not shown in the drawing. Numerals 4a, 4b and 4c denote light receiving devices which receive the light beam coming from each region of the movable scale 3 to be stated later. Numeral 5 denotes an amplification circuit and numeral 6 denotes the waveform shaping circuit which shapes the waveform of the output signal given by the amplification circuit 5. Numeral 7 denotes the direction discriminant counter which discriminates the direction of shift of movable scale 3 by using the output signal with two specified phase differences from the waveform shaping circuit 6. Numeral 8 denotes the displacement amount detecting circuit which detects the amount of displacement of movable scale 3.

Figure 3A:
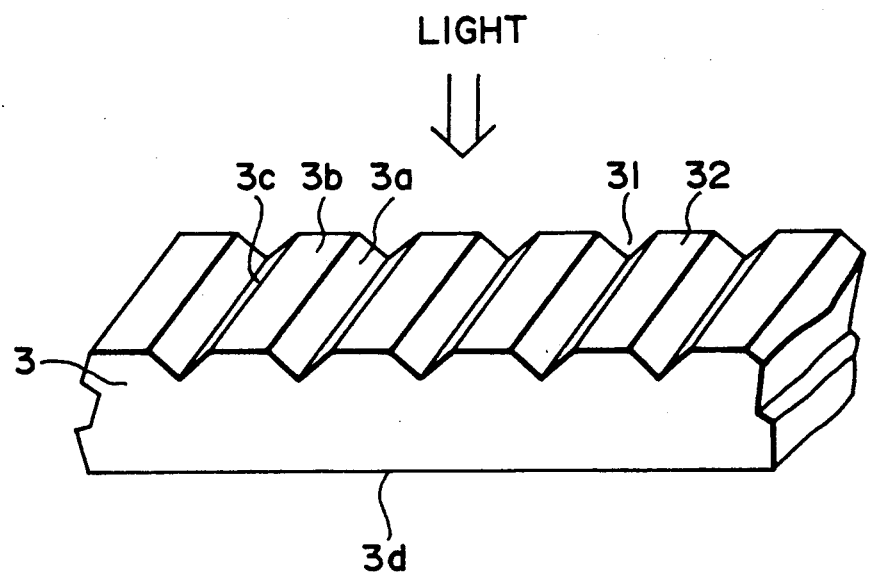
Figure 3B:
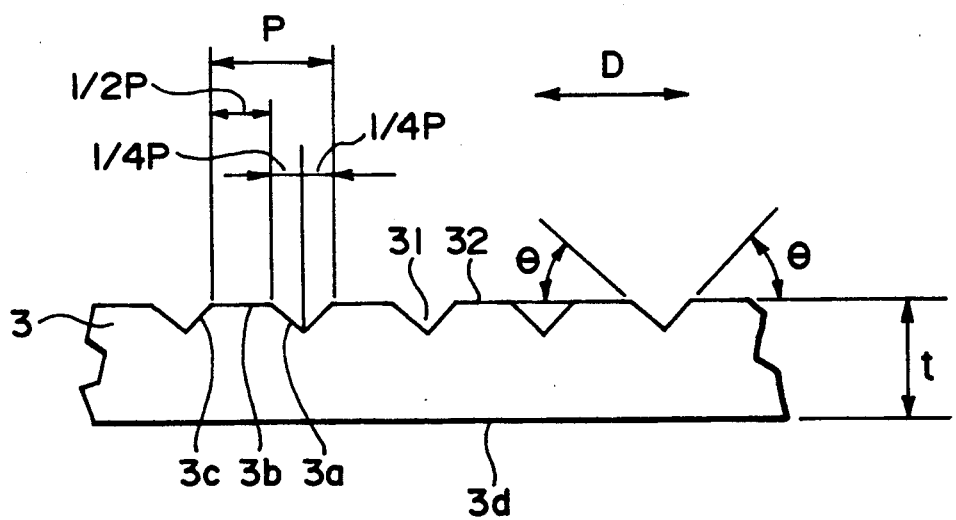

FIGS. 3A and 3B are a schematic view of movable scale 3 shown in FIG. 1 and a sectional view in the progressive direction of the light beam, respectively. The movable scale 3 is composed of transparent parallel planes obtained by molding glass or plastic and it is composed of V-shape grooves 31 provided on the incident surface of the light beam coming from the light emitting device 1 in the direction perpendicular to the moving direction D of the movable scale at the space equal to the grating pitch P of the stationary scale 2 and the light transmission plane portions 32 provided at equal space intervals with pitch P in the moving direction D of the movable scale.

The angle $\theta$ made by the two inclined surfaces 3a and 3c which form V-groove 32 as against the back plane 3d is 45° respectively, while the light transmission surface 3b is in parallel with the plane 3d.

Figure 4:
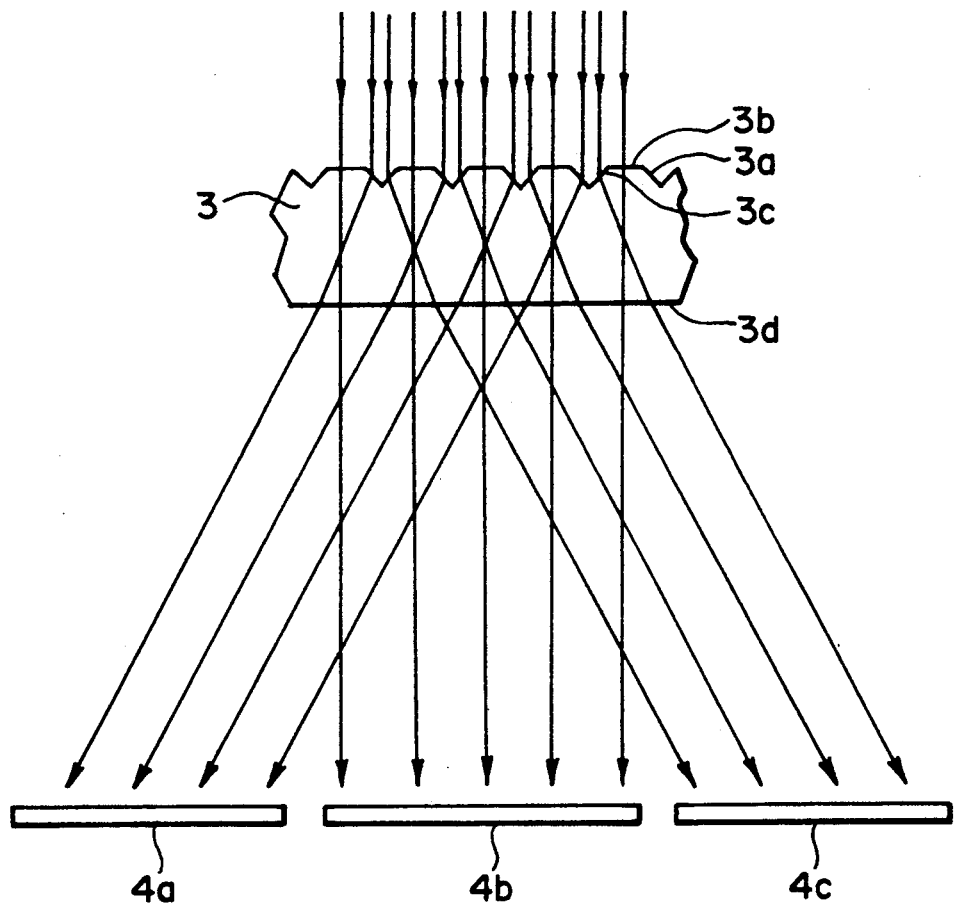
FIG. 4 is an explanatory drawing of the light beam passing through the movable scale of FIG. 1, FIGS. 5-8 are explanatory drawings of the light beam passing through both the fixed scale and movable scale of FIG. 1 when they are at the special position.

In this embodiment, of the parallel light beams coming from the light emitting device 1, the light beam having passed through the transmission portion of the stationary scale 2 is caused to be incident on the movable scale 3. The light beam having passed through the V-groove 31 of movable scale 3 and the light transmission plane portion 32 is caused to refract and simply pass therethrough as illustrated in FIG. 4 and is incident on the light receiving surface of light receiving devices 4a, 4b and 4c provided in the exit direction of the respective light beams. The light receiving devices are so arranged that any light beams other than the objective light beam shall not be incident thereon.

At this time, in the case of the present embodiment it is so arranged that the V-groove 31 has the width one-half of pitch P, the width of two inclined surfaces 3a and 3b are equally one-quarter of P and a width of light transmission plane portion 32 is one-half of pitch P as shown in FIG. 3 so that the output signals from the light receiving devices 4a, 4c have a phase difference of 90° from each other.

With the present embodiment, a parallel light beam with spatially uniform distribution of intensity is caused to be perpendicularly incident on the movable scale 3 and the incident beam is divided into three direction by three regions 3a, 3b and 3c of the movable scale 3.

Of such beams, the beam which has been refracted to emerge in the direction determined by the angle of slope of the inclined surfaces 3a and 3c is caused to be respectively incident on the light receiving devices 4a and 4c and the beam having been perpendicularly incident on the light transmission surface 3b and transmitted therethrough is caused to be incident on the light receiving device 4b. By using the two output signals having the specified phase difference received from light receiving device 4a and 4c, the displacement such as the amount of shift, direction of shift etc. of the movable scale 3 can be detected.

Next, in the present embodiment, four different states of incidence of light beam emitted by the light emitting device 1 into the light receiving devices 4a, 4b and 4c, resulting from the difference of relative position of the movable scale 3 and the stationary scale 2 are explained in FIGS. 5 to 8.

Figure 5:
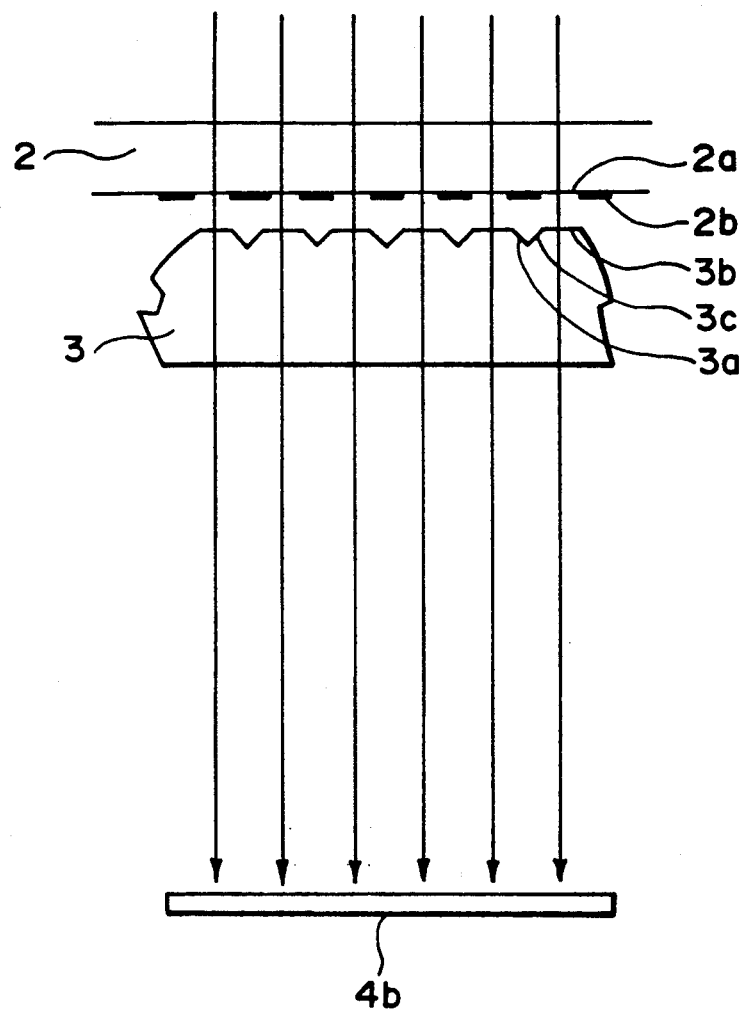

FIG. 5 shows the case when the light transmission portion 2a of the stationary scale 2 overlaps the light transmission plane portion 3b of the movable scale 3. All of the parallel light beams which have passed through the light transmission portion 2a of the stationary scale 2 pass through the light transmission plane portion 3b of the movable scale 3 and are incident on the light receiving device 4b. At this time, the light beams are not incident on the light receiving devices 4a and 4c.

Figure 6:
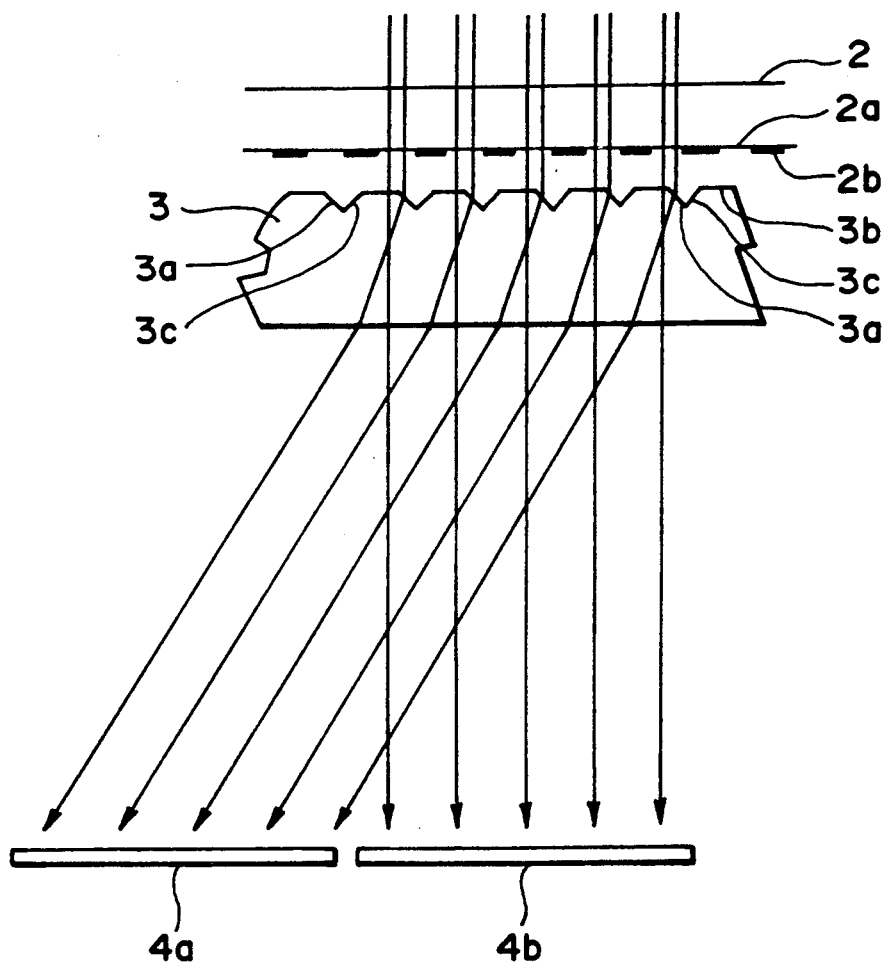

FIG. 6 shows the case when the light transmission portion 2a of the stationary scale overlaps one-half of the light transmission plane portion 3b of the movable scale 3 and the inclined surface 3a. One-half of the light beams having passed through the light transmission portion 2a of the stationary scale 2 are incident on the light transmission plane portion 3b and the remaining one-half of the light beams are incident on the inclined surface 3a. As a result, the light beams exiting from the movable scale 3 are equally incident on the light receiving devices 4a and 4b. At this time, the light beams are not incident on the light receiving device 4c.

Figure 7:
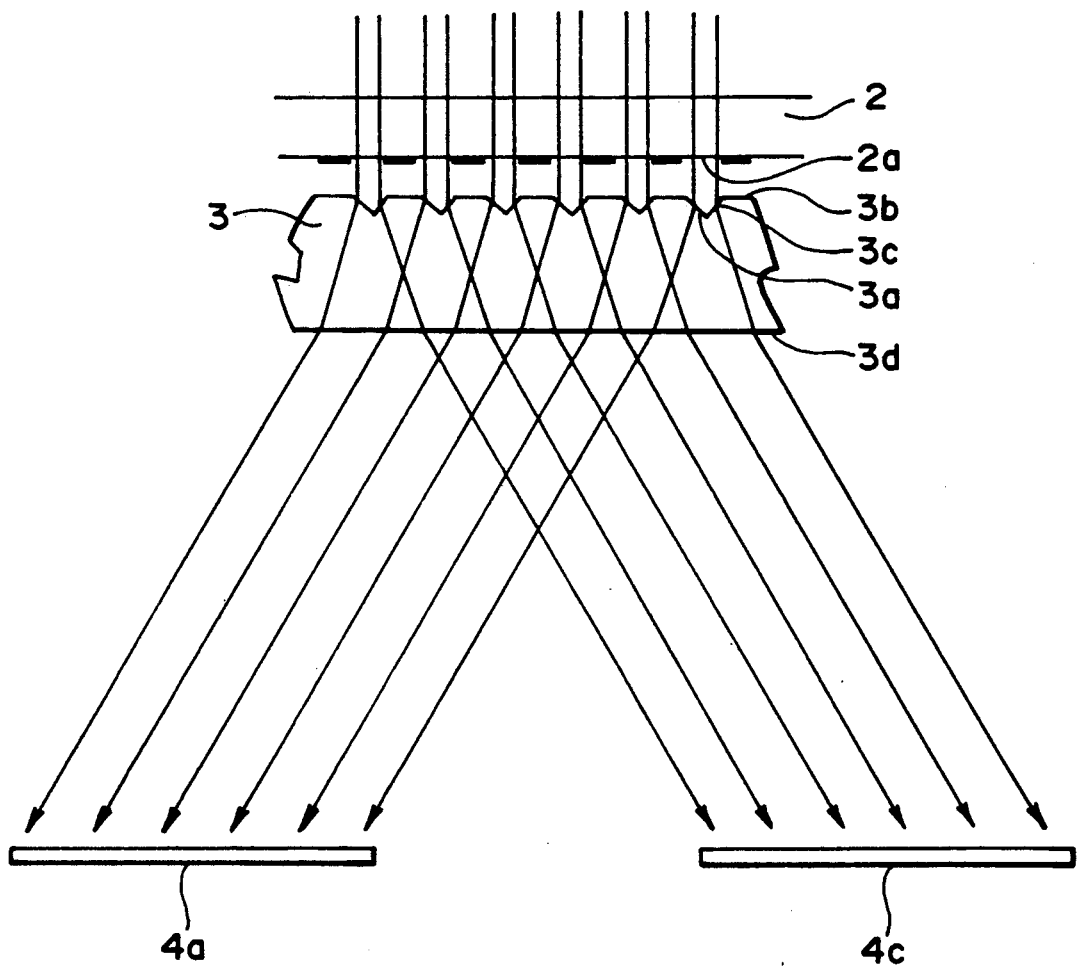

FIG. 7 shows the case when the light transmission portion 2a of the stationary scale 2 overlaps the two inclined surfaces 3a and 3c of V-groove of the movable scale 3. One-half of the light beams having passed through the light transmission portion 2a of the stationary scale 2 are incident on the inclined surface 3a and the remaining one-half of the light beams are incident on the inclined surface 3c and as a result, the light beams are equally incident on the two light receiving devices 4a and 4c. At this time, light beams are not incident on the light receiving device 4b.

Figure 8:
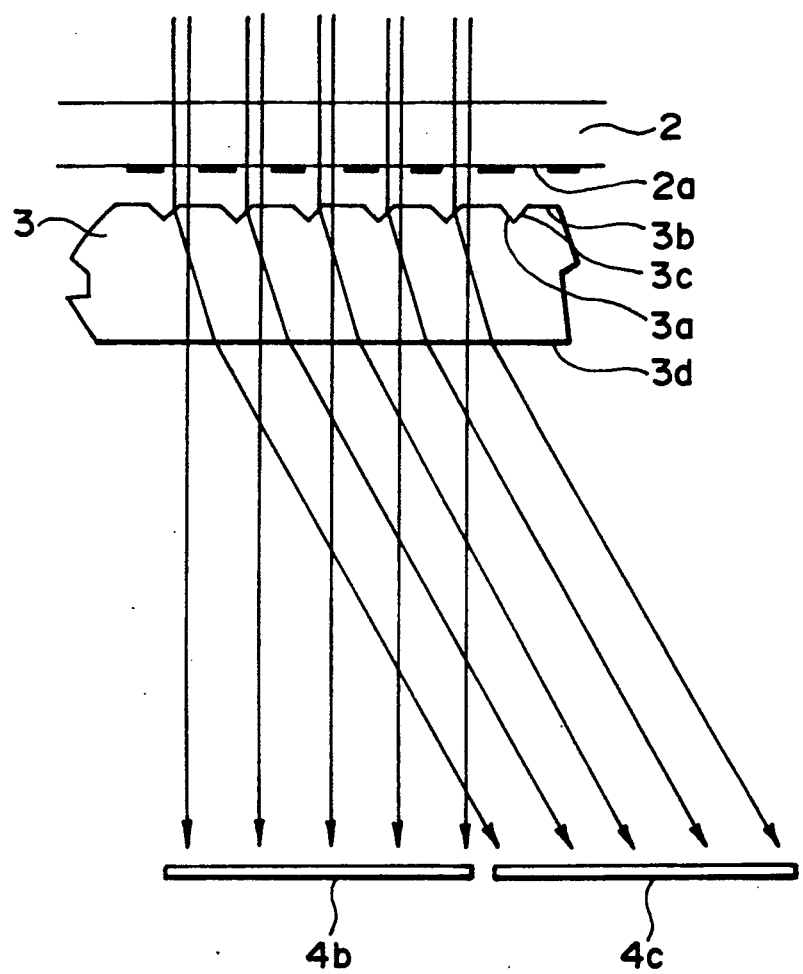

FIG. 8 shows the case when the light transmission portion 2a of the stationary scale 2 overlaps one-half of the region of the light transmission plane portion 3b of the movable scale 3 and inclined surface 3c. One-half of the light beams having passed through the light transmission portion 2a of the stationary scale 2 are incident on the light transmission plane portion 3b and the remaining one-half of the light beams are incident on the inclined surface 3c and as a result, light beams are incident on the light receiving devices 4b and 4c. At this time, light beams are not incident on the light receiving device 4a.

Figure 9A:
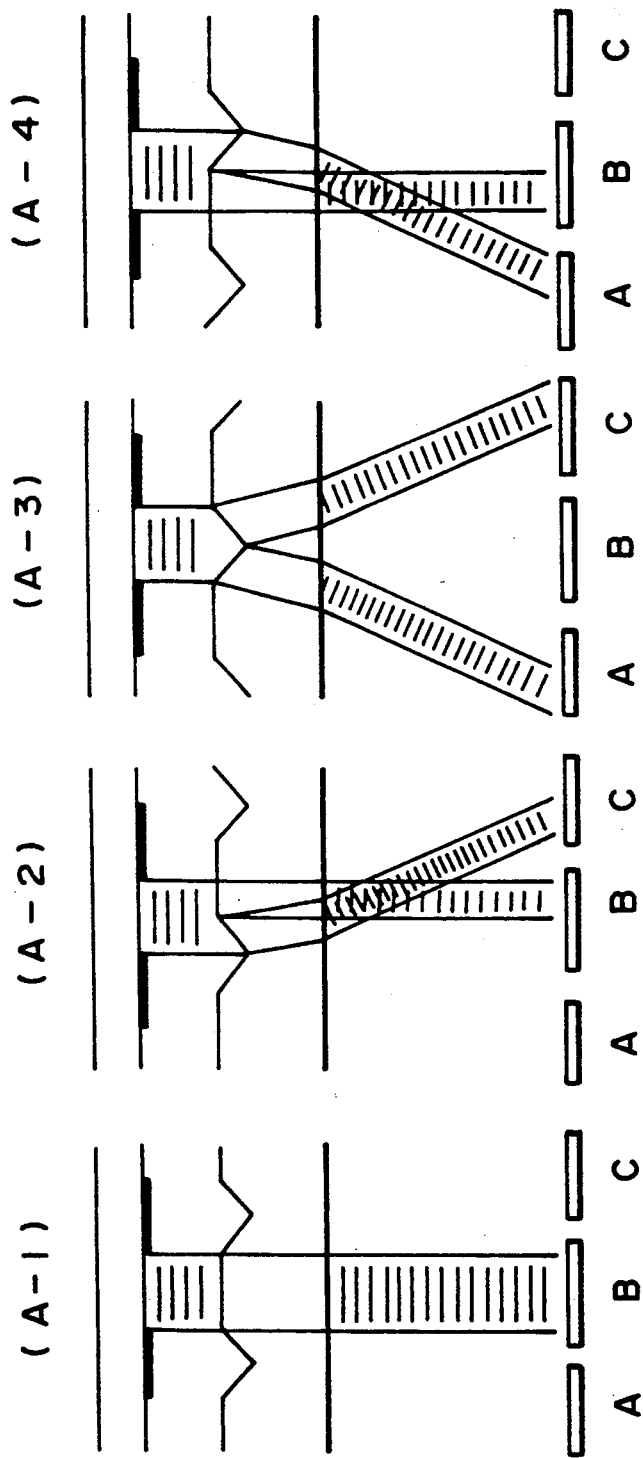
Figure 9B:
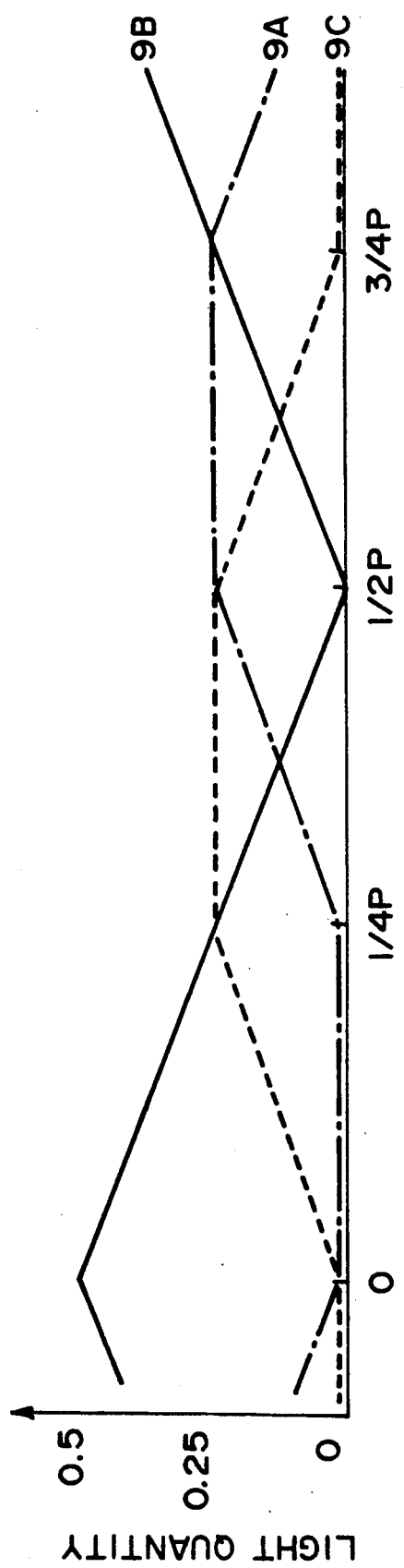

FIGS. 9A and 9B show the change of light quantity received by light receiving devices 4a, 4b and 4c when the relative position of the stationary scale 2 and the movable scale 3 shown in FIGS. 5–8 continuously changes.

FIG. 9A is the schematic drawing corresponding to FIGS. 5–8 and FIG. 9B shows the change of theoretical light quantity received by each light receiving device, the axis of abscissa of the figure representing the amount of displacement of the movable scale.

Numerals 9a and 9c in the figures indicate the relative change of light quantity received by light receiving devices 4a and 4c, the phase of the two being shifted by 90°.

FIG. 10A shows the theoretical output signal S received from the respective devices when the relative position of the stationary scale 2 and the movable scale 3 continuously changes in the same way as in the FIG. 9B.

In this figure, the output signal S is the theoretical output signal to be given on the assumption that the light emitting from the light emitting device 1 is a parallel light beam and the light exiting from the transmitting portion of the stationary scale is not diffracted and there is no loss of light quantity at each incident surface and exit surface.

On the other hand, FIG. 10B shows the waveform of the actual output signal of the respective light receiving device 4a, 4b and 4c in the realistic case when the aforesaid assumption is not established in FIG. 10A.

As indicated in FIGS. 10A and 10B, in either case, the output signals of light receiving devices 4a and 4c mutually have phase difference of 90°.

The inclined surfaces 3a and 3c of the V-groove of the movable scale 3 in the present embodiment are not limited to those having the angle of slope of 45° as shown in FIG. 3 but it may be any angle as long as it causes the light beam incident on the inclined surfaces 3a and 3c to easily be separated into two directions to be incident on the two light receiving devices.

However, when the slope angle $\theta$ is too small, the angle of separation of the light beam becomes small and it becomes necessary to arrange the light receiving device at the position far apart from the movable scale and consequently the entire apparatus becomes larger which is not desirable. On the other hand, when the inclination angle $\theta$ is too large, the light beam refracted at the inclined surfaces 3a and 3c is totally reflected at the surface d which is the bottom plane and therefore the angle should be set at an angle which does not cause total reflection.

Besides, even when the beam is not totally reflected, when the slope angle is large, loss of light beam at the surface d increases and therefore the slope angle $\theta$ is preferably set within the range of $30° < \theta < 60°$ As shown in FIG. 3B, the present embodiment shows the case where the surface on light incidence of the movable scale 3 is composed of a V-groove 31 having the aforesaid pitch (width of inclined surfaces 3a and 3c is set at 1/4P) and the light transmission plane portion 32 (width is 1/2P) and the output signals of two light receiving devices 4a and 4c have a phase difference of 90° but by providing the V-groove and light transmission portion for the arbitrary width of less than one pitch, it is possible to provide an arbitrary phase difference in the range of 0° to 180°.

Figure 11A:
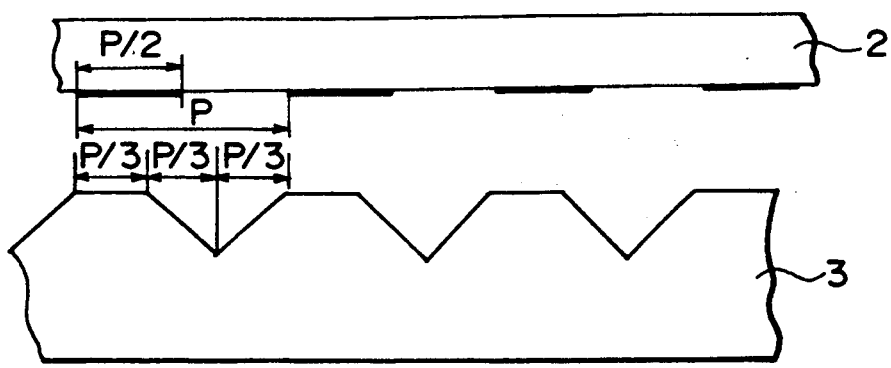
FIGS. 11A, 11B and 11C are explanatory drawings of an example of an embodiment when the V-groove of the movable scale and the width of the light transmission surface of the present invention are changed.

For example, FIG. 11A is a schematic drawing of the embodiment where the width of a V-groove is set at 2/3P, the width of the light transmission portion is set at 1/3P and the phase difference of 120° is given to the output signals from the two light receiving devices. In this case, the width of the two inclined surfaces of the V-groove is 1/3P and the width of the light transmission portion and light shielding portion is respectively 1/2P.

Figure 11B:
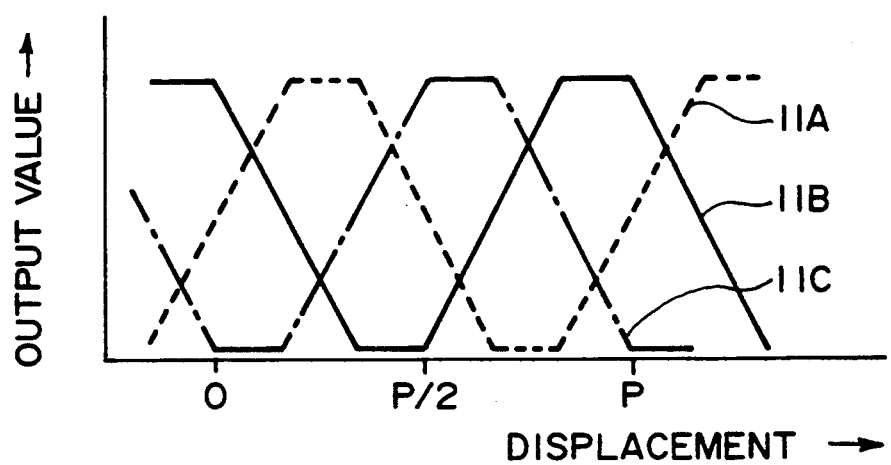
Figure 11C:
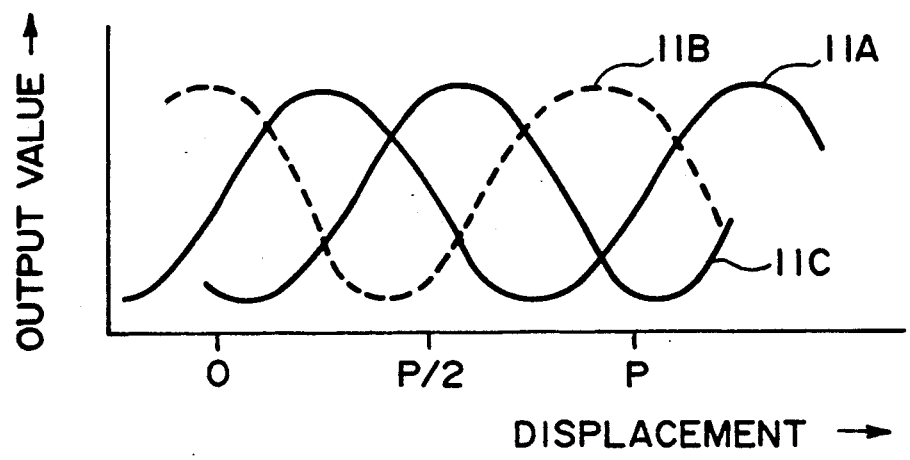

FIGS. 11B and 11C show the output signals obtained from each light receiving device as shown in FIGS. 10A and 10B, and in the FIGS. 11B and 11C, the output signals 11A and 11C mutually having the phase difference of 120° are obtained from the two light receiving devices.

Generally speaking, with the configuration as illustrated in FIG. 3B, the relation between the width a of V-groove, the width b of light transmission plane portion and the phase difference δ of the output signals of the two light receiving devices shall be represented as follows:

$$a = \frac{\delta}{360} P \quad (= C)$$

$$b = \left(1 - \frac{\delta}{180}\right) P$$

At this time, the width of the light transmission portion and light shielding portion of the stationary scale are both 1/2P.

According to the above embodiment, it is possible to obtain the optical encoder which makes it easy to obtain a plural number of output signals having arbitrary phase differences by using an optical scale having the V-groove of a specified configuration and the light transmission plane portion within one pitch and causing the light beam having passed through such optical scale to be incident on a plural number of light receiving devices.

Particularly it is possible to obtain the optical encoder which gives a stable output signal with much less error in phase difference, which is often caused by the directionality of the light source, deviation of azimuth angle of the stationary scale and the movable scale, and variation of the clearance between the stationary scale and the movable scale, which are the problems in the conventional detection methods.

In the above embodiment, there is provided such construction that the light beam traveling straight and the beams refracted to the right and left respectively are individually detected by three light receiving devices 4a, 4b and 4c and by using the outputs of light receiving devices 4a and 4c i.e., detection outputs of the beams refracted in the right and left direction, the relative displacement amount and the displacement direction of the scale are detected. However, if it is not necessary to detect the displacement direction, the relative displacement amount of the scale can be detected by using only the output of either one of the three light receiving devices.

In the above embodiments, it is possible to similarly attain the objective of the present invention by exchanging the arrangement of the movable scale and the stationary scale and arranging the movable scale at the side of light emitting device 1 and the stationary scale at the side of light receiving device.

Figure 12:
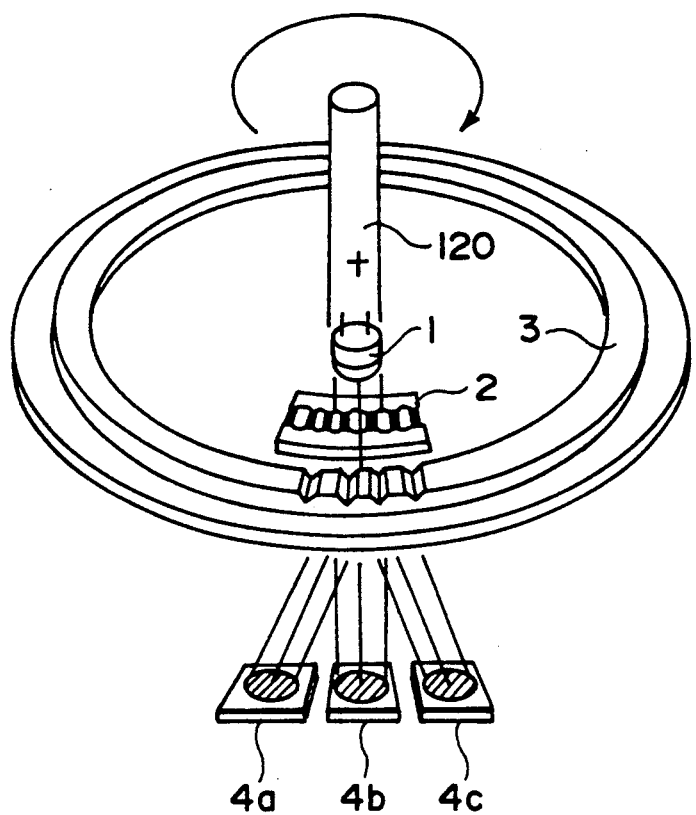
FIG. 12 is a schematic drawing of an example of an embodiment when the present invention is applied to a rotary encoder.
Figure 13:
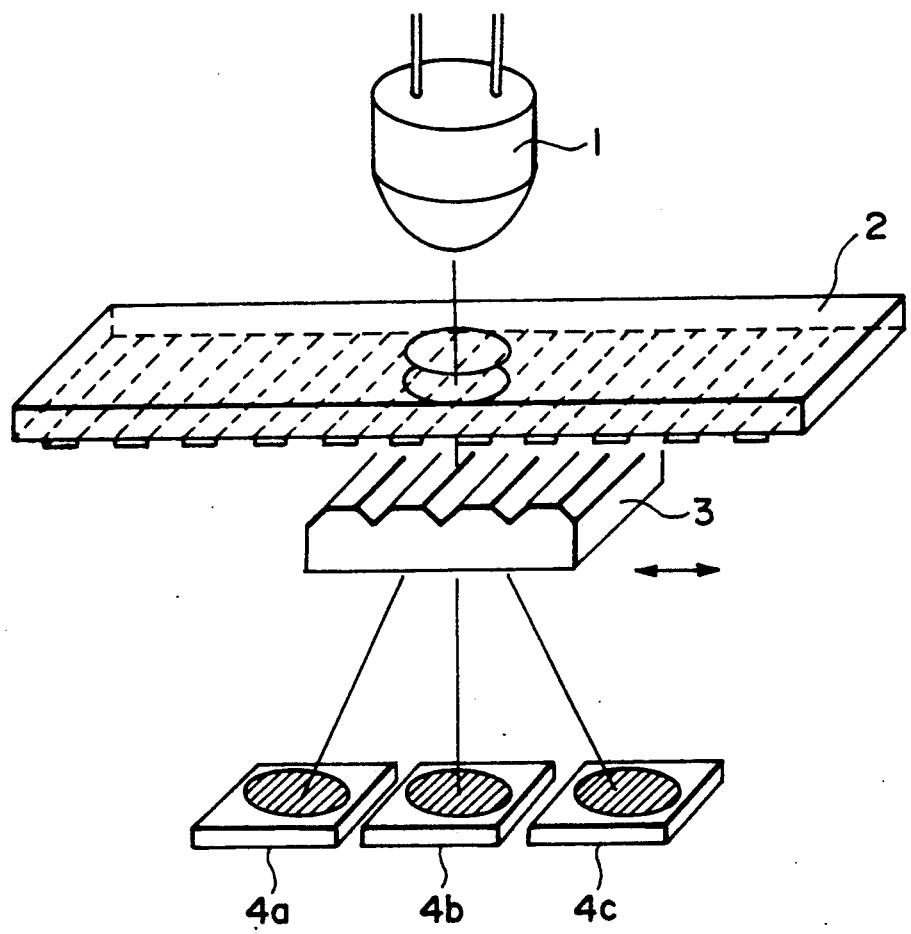
FIG. 13 is a schematic drawing of an example of an embodiment when the present invention is applied to a linear encoder.

FIG. 12 is a schematic drawing of the embodiment where the present invention is applied to a rotary encoder and FIG. 13 is a schematic drawing of the embodiment where the present invention is applied to a linear encoder.

In the FIGS. 12 and 13, numeral 1 denotes the light emitting device, numeral 2 denotes the stationary scale and numeral 3 denotes the movable scale which is, for example, so constructed as shown in the FIGS. 3A and 3B. Numerals 4a, 4b and 4c respectively denotes light receiving devices.

The movable scale 3 is attached to an object to be measured. By receiving the light beam having passed through the light transmission portion of the stationary scale 2 and the V-groove of the movable scale 3 with the light receiving devices 4a and 4c in such a way that phase difference is given, the direction and the amount of displacement of the object to be measured is detected.

Figure 14:
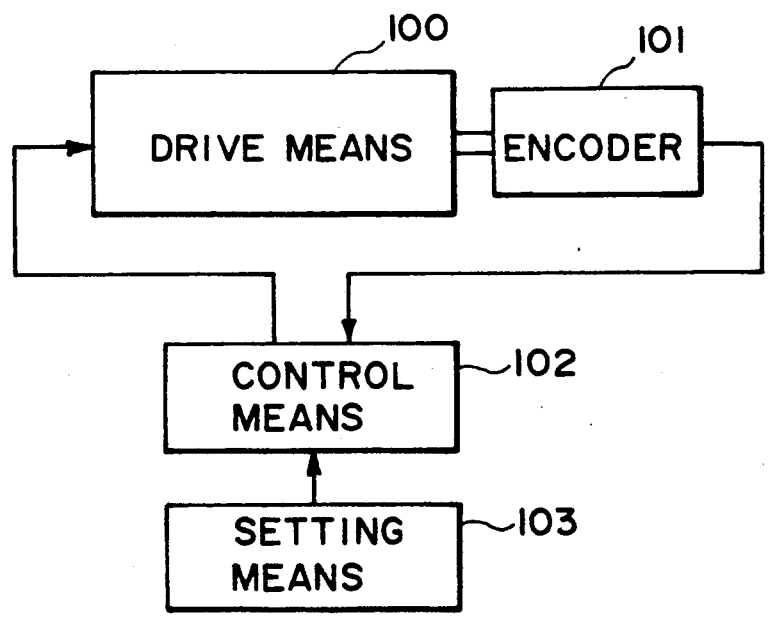
FIG. 14 is a block diagram of a drive system including an encoder.

FIG. 14 shows the example of use of the encoders such as a rotary encoder or a linear encoder and it is a block diagram of the drive system using the encoder. An encoder 101 is connected to the drive output section of drive means 100 having the driving source such as a motor, actuator, internal combustion engine etc or to the moving section of the object to be driven so as to detect the driving conditions such as rotation amount, rotation speed, shifting amount, shifting speed, etc.

The detection output of this encoder 101 is fed back to the control means 102 in which the driving signal is transmitted to the driving means 100 so that the conditions set by setting means 103 are realized. By constructing such feed back system, it is possible to maintain the driving conditions set by the setting means 103 without being affected by the external disturbance. The drive system as explained above may be applied not only to the machine tool, manufacturing machine, measuring instrument, recording apparatus etc but also to other types of apparatus having drive means.

I claim:

1. An encoder comprising:

light generating means for generating irradiating light;

a first scale on which substantially light transmitting portions and light shielding portions are periodically formed;

a second scale on which V-shape grooves and light transmitting plane portions are periodically provided at a first surface facing said first scale, said second scale being displaced relatively to said first scale and having a second surface through which the irradiating light passes;

light receiving means, arranged proximate to said second surface side of said second scale, for receiving the light passed through said first and second scales and outputting a signal; and detecting means for detecting the relative displacement state of said first and second scales on the basis of the output signal from said light receiving means.

2. An encoder according to claim 1, wherein said light receiving means includes two light receiving devices provided in the direction of light refraction from each inclined surface forming one of said V-shape grooves of said second scale so as to detect the relative displacement amount and/or the relative displacement direction of said first and second scales on the basis of the output of each light receiving device.

3. An encoder according to claim 1, wherein said light receiving means includes a light receiving device provided in the direction of an optical axis of the irradiating light so as to detect the relative displacement amount of said first and second scales on the basis of the output of said light receiving device.

4. An encoder according to claim 1, wherein said light receiving means includes a light receiving device provided in the direction of an optical axis of the irradiating light and two light receiving devices provided in the direction of refraction of light from each inclined surface of one of said V-shaped grooves of said second scale.

5. An encoder according to claim 1, wherein the width between the adjacent V-shape grooves is pitch P, the width of one inclined surface of said V-shaped groove and the width of said light transmitting plane portion are set to be P/4 and P/2, respectively.

6. An encoder according to claim 2, wherein the width between and the adjacent V-shape grooves is pitch P, the width of one inclined surface of said V-shape groove and the width of said light transmission plane portion are set to be P/4 and P/2, respectively, and wherein output signals having phase difference of 90° are obtained from said two light receiving devices.

7. An encoder according to claim 1, wherein the width between the adjacent V-shape grooves is pitch P, the width of one inclined surface of said V-shape groove and the width of said light transmitting plane portion are set to be P/3.

8. An encoder according to claim 4, wherein the width between the adjacent V-shape grooves is pitch P, the width of one inclined surface of said V-shape groove and the width of said light transmission plane portion are set to be P/3, and wherein output signals having phase difference of 120° are obtained from said light receiving devices.

9. An encoder according to claim 1, wherein grating-like light transmission portions and light shielding portions are periodically formed at equal intervals on said first scale.

10. An encoder according to claim 1, wherein said encoder is a linear type encoder and said second scale is provided in the direction of linear movement.

11. An encoder according to claim 1, wherein said encoder is a a rotary type encoder and said second scale is provided in the direction of rotation.

12. A drive system including an encoder, comprising:
a driver having a drive output section;
an encoder provided on said drive output section for detecting a driving state and outputting the detection; and control means for controlling said drive means on the basis of the output of said encoder, wherein said encoder comprises:
light generating means for generating irradiating light;
a first scale on which substantially light transmitting portions and light shielding portions are periodically formed;
a second scale on which V-shape grooves and light transmitting plane portions with the same height are periodically formed on a first surface facing said first scale, said second scale having a second surface and being displaced relatively to said first scale in response to the output of said drive output section;
light receiving means, arranged proximate to said second surface side of said second scale for receiving light through said first and second scales and outputting a signal; and
detecting means for detecting the relative displacement state between said first and second scales to detect the driving state on the basis of the output signal from said light receiving means.

13. An encoder according to claim 1, wherein the V-shape grooves have inclined surfaces with a slope angle $\theta$ set to be within the range of $30° < \theta < 60°$.

14. An encoder according to claim 1, wherein the V-shape grooves have inclined surfaces with a slope angle $\theta$ set to be $\theta = 45°$.

15. An encoder comprising:
a transparent scale on one side of which is a periodical pattern having a predetermined pitch formed by inclined surface portions and substantially horizontal surface portions;
an optical system for generating light having bright portions and dark portions at a pitch the same as the predetermined pitch, wherein the light is irradiated on said transparent scale on said one side where the periodical pattern is formed; and
detecting means having a plurality of sensors to receive the light having passed through said transparent scale for detecting the relative displacement state between the light and said scale.

16. An encoder according to claim 15, wherein said detecting means has two sensors so as to obtain signals with a phase difference of 90°.

17. An encoder according to claim 15, wherein said plurality of sensors are respectively arranged corresponding to each surface of said transparent scale.

18. An encoder according to claim 15, wherein said detecting means has means for detecting either one or both of the displacement amount and the displacement direction.

19. An encoder comprising:
a transparent scale on one side of which is a periodical pattern having a predetermined pitch formed by at least three surfaces of which each normal line is different from one another;
an optical system having a light source for generating at least one light beam having a width different from the predetermined pitch, wherein the light beam is irradiated on said transparent scale on said one side where the pattern is formed; and
detecting means having a plurality of sensors to receive the light having passed through said transparent scale for detecting the relative displacement state between the light beam and said transparent scale.

20. An encoder according to claim 19, wherein said detecting means has two sensors so as to obtain signals with a phase difference of 90°.

21. An encoder according to claim 19, wherein said plurality of sensors are respectively arranged corresponding to each surface of said transparent scale.

22. An encoder according to claim 19, wherein said detecting means has means for detecting either one or both of the displacement amount and the displacement direction.

* * * * *

UNITED STATES PATENT AND TRADEMARK OFFICE
CERTIFICATE OF CORRECTION

PATENT NO. : 5,124,548
DATED : June 23, 1992
INVENTOR(S) : Masahiko Igaki

It is certified that error appears in the above-identified patent and that said Letters Patent is hereby corrected as shown below:

On the title page:
[56] REFERENCES CITED:

FOREIGN PATENT DOCUMENTS, "84-063517 4/1984 Japan . and 85-140119 7/1985 Japan . " should read --59-063517 4/1984 Japan . and 60-140119 7/1985 Japan . --.

COLUMN 1:

Line 45, "0°180°," should read --0°-180,°--.

COLUMN 5:

Line 2, "on light incidence of" should read --of light incidence on--.

COLUMN 7:

Line 30, "the" should be deleted.
Line 35, "and the" should be deleted.
Line 42, "the" should be deleted.
Line 47, "the" should be deleted.

Signed and Sealed this

Twelfth Day of October, 1993

Attest:

BRUCE LEHMAN

*Attesting Officer*     *Commissioner of Patents and Trademarks*